United States Patent [19]

Rieger

[11] Patent Number: 4,593,612

[45] Date of Patent: Jun. 10, 1986

[54] UPRIGHT RED WINE FERMENTATION TANK

[76] Inventor: Herbert Rieger, Talstrasse 33, 7121 Ingersheim, Fed. Rep. of Germany

[21] Appl. No.: 613,149

[22] Filed: May 23, 1984

Related U.S. Application Data

[63] Continuation-in-part of Ser. No. 460,845, Jan. 25, 1983, abandoned.

[30] Foreign Application Priority Data

Jan. 30, 1982 [DE] Fed. Rep. of Germany ....... 3203161
Mar. 22, 1984 [DE] Fed. Rep. of Germany ....... 3410458
Mar. 22, 1984 [DE] Fed. Rep. of Germany ....... 3410459

[51] Int. Cl.$^4$ .............................................. C12G 1/02
[52] U.S. Cl. ...................................... 99/277.2; 426/7; 366/144; 366/297; 366/298; 366/300
[58] Field of Search .............. 99/275, 276, 277, 277.1, 99/277.2, 278, 348; 426/7; 366/144–149, 297, 298, 299, 300, 301, 315, 316, 317

[56] References Cited

U.S. PATENT DOCUMENTS

| 446,948 | 2/1891 | Lynott | 366/316 |
|---|---|---|---|
| 938,407 | 10/1909 | Bean | 366/316 |
| 959,811 | 5/1910 | Smith | 366/316 |
| 2,943,752 | 7/1960 | Platt . | |
| 3,100,052 | 8/1963 | Brembeck | 414/326 |
| 3,466,015 | 9/1969 | Lodige | 366/300 |
| 3,481,512 | 12/1969 | Scheffer | 222/413 |
| 3,719,307 | 3/1973 | Larson | 222/236 |
| 3,893,811 | 7/1975 | Good | 366/147 |
| 4,164,902 | 8/1979 | Maarleveld | 99/277.1 |
| 4,199,266 | 4/1980 | Giusti | 99/348 |

FOREIGN PATENT DOCUMENTS

| 1150024 | 3/1963 | Fed. Rep. of Germany . |
| 2428655 | 1/1976 | Fed. Rep. of Germany . |
| 3143287 | 4/1982 | Fed. Rep. of Germany . |
| 3102134 | 10/1982 | Fed. Rep. of Germany . |
| 2469451 | 8/1981 | France . |
| 5172 | of 1899 | United Kingdom . |
| 1265421 | 7/1972 | United Kingdom . |

OTHER PUBLICATIONS

"Technologic des Weines" by Gerhard Trost, 4th edition, 1972, p. 65.

Primary Examiner—Robert W. Jenkins
Attorney, Agent, or Firm—Spencer & Frank

[57] ABSTRACT

An upright red wine fermentation tank has a substantially circular cross-section taken vertically to its cenhter plane (24). An agitator is arranged in the tank 10. The agitator can be rotated about at least one preferably horizontal shaft (20), and its agitator elements sweep at least through a substantially spherical volume.

45 Claims, 31 Drawing Figures

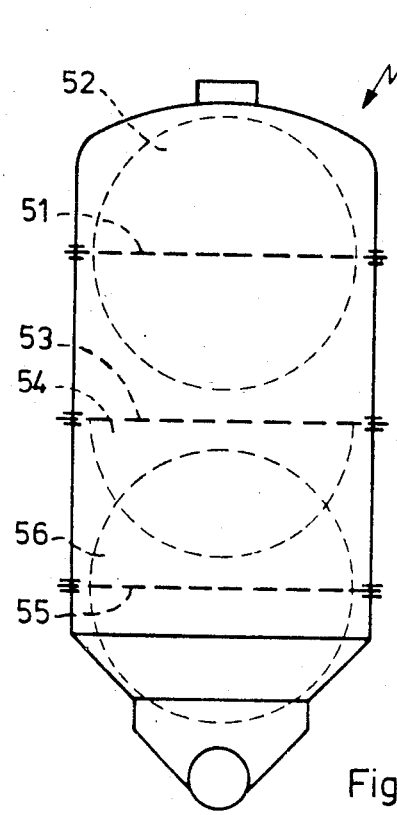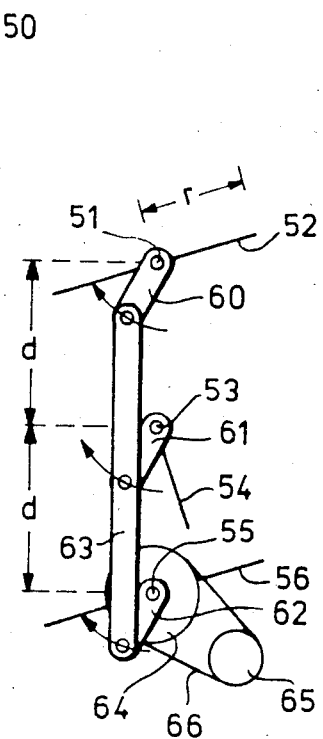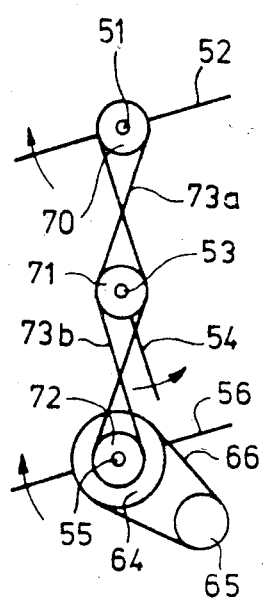
Fig. 7          Fig. 8          Fig. 9
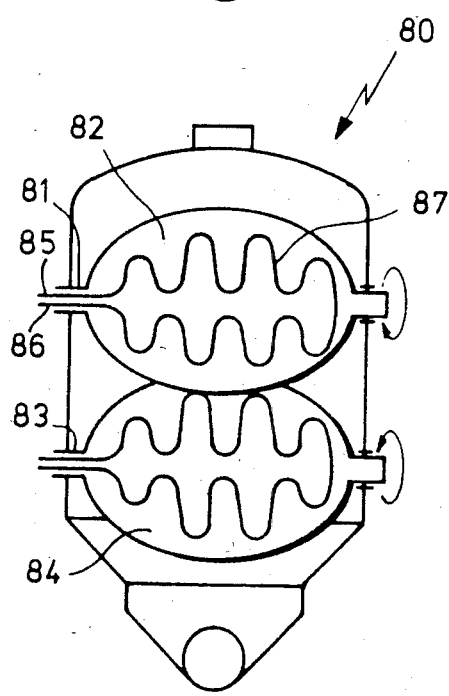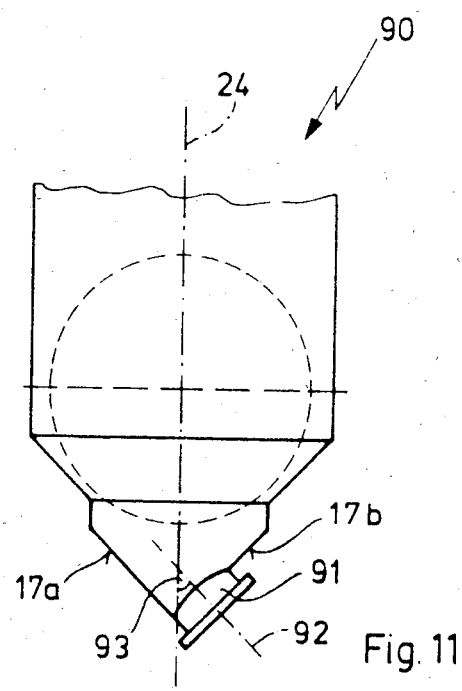
Fig. 10          Fig. 11

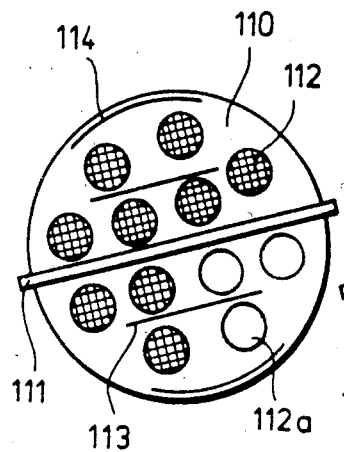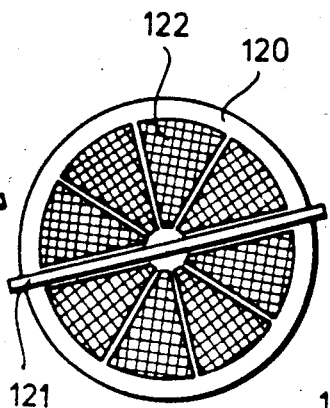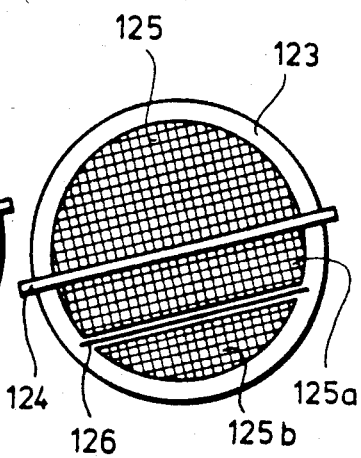
Fig. 13　　　Fig. 14　　　Fig. 15
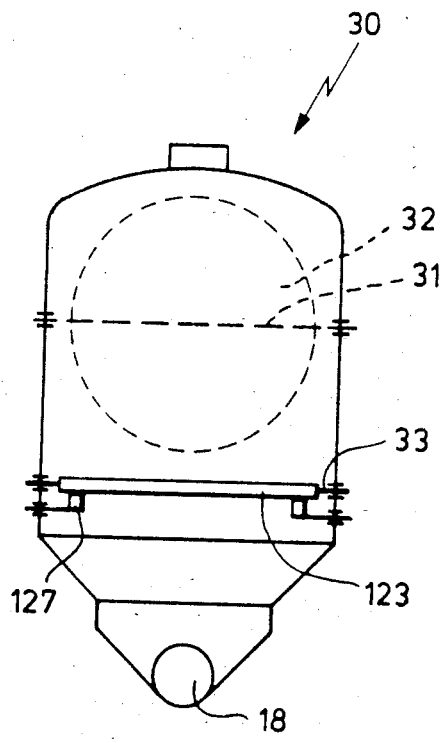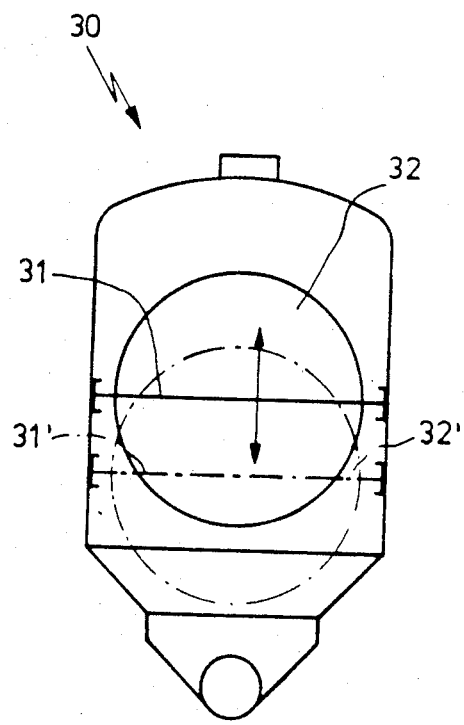
Fig. 16　　　Fig. 17

UPRIGHT RED WINE FERMENTATION TANK

This invention is a continuation-in-part of application Ser. No. 06/460,845, filed on Jan. 25, 1983, now abandoned.

The present invention relates to an upright red wine fermentation tank having a substantially circular cross-section, taken vertically to the center plane, and an agitator arranged within the tank.

A tank of this type has been known from German Disclosure Document No. 31 43 287.

BACKGROUND OF THE INVENTION

Wine grapes consist of shells containing the pulp. When agitated in a fermentation tank, grape mash is formed consisting of the liquid components, i.e. the grape juice and the solid components, namely the shells, the pips and the rapes. Red wine grape mash is agitated to wash the red color, being mostly contained in the shells, out of the shells. The solid components enumerated above are also referred to as pomace.

Before fermentation and especially during the discharge of juice, the pomace of the grape mash tends to settle in the funnel-shaped bottom. To allow the pomace to be removed from the tank after the juice has flowed off, known tanks have a discharge screw provided at the lower end of the funnel-shaped bottom. Although all the pomace which enters the area of the screw is discharged by means of the screw, it happens often, especially when the pomace is not discharged immediately after the juice has been drained off, that the pomace cakes together to form a bridge above the screw and to prevent any further pomace from entering the area of the screw. Accordingly, it is often necessary in known tanks of this type to introduce a long rod through the filling orifice with the aid of which to destroy the bridge of pomace cake formed above the discharge screw and to poke additional pomace into the area of the screw.

In the known upright red wine fermentation tanks of the type described before, which have a substantially upright cylindrical shape, the agitators are arranged coaxially to the cylinder axis so that the agitator axis coincides with the center plane of the cylinder and the agitating members extend in the form of agitator arms or blades radially from the vertical agitator shaft.

Upright grape mash tanks of the type described before are used in cellarage for storing and/or treating white grape mash or red grape mash. While in the case of white grape mash the main function is to be seen in the storing and dripping of the grape mash, i.e. the separation of liquid and solid components, the treating function is an important additional element in the case of red grape mash, because contrary to white grape mash, red grape mash must be stirred during fermentation to wash out the red color from the shells.

However, regardless of the type of mash in the tank, there always exists the before-mentioned necessity to separate the solid and liquid components with the aid of so-called dripping means, usually a screen arrangement.

Although these known fermentation tanks operate normally in a satisfactory manner, it has been found that markedly inconsistent results are obtained with certain vine species, in particular for high-quality wines. This is probably due to the fact that tanks of specific dimensions, especially of particular height/diameter ratios, are better suited for certain vine species than others. The reason for this phenomenon is probably to be seen in functional differences of the agitator, which is of course adapted to the dimensions of the tank, so that different wine qualities are obtained for different high-quality vine species.

Further, it must be taken into consideration that red grapes cultivated in northern areas have a lesser content of red color than grapes grown, for example, in the Mediterranean region. In the case of the first-mentioned grapes grown for instance in Central European or North American regions it is, therefore, necessary to ensure a particularly thorough color extraction during treatment of the red grape mash in the fermentation tank.

Quite satisfactory results have been obtained, as regards a consistent and at the same time high wine quality on the one hand and the best possible color extraction on the other hand, with horizontal red grape fermentation tanks which are themselves of a horizontal cylindrical design and in which the agitator rotates about a horizontal shaft. But due to the unfavorable static conditions, such horizontal red grape fermentation tanks are much more difficult to control and, thus, much more expensive to produce.

Now, it is the object of the present invention to improve a fermentation tank of the type described before so that without affecting the high quality of the wines, a consistent high quality can be achieved even for different vine species, that perfect color extraction is rendered possible and that, finally, these advantages need not be paid for by unproportionately high production costs of the tank.

SUMMARY OF THE INVENTION

According to the invention, this object is achieved by an arrangement in which the agitator is mounted to rotate about at least one preferably horizontal shaft in the tank and its agitator elements sweep through at least a substantially spherical volume.

Thus, the red wine fermentation tank of the invention offers the considerable advantage that the upright cylindrical tank shape can be used which is more favorable from the statical point of view and easier to produce. On the other hand, the uniform stirring of a spherical volume ensures that no quality variations are encountered for different vine species due the mash being uniformly mixed; and finally, the practically perfect mixing of the stirred volume ensures optimum color extraction from the mash. The agitator shaft extends preferably in the horizontal direction, but may also be inclined or even extend vertically.

In a tank described on page 65 of the book "Technologie des Weines", 4th edition 1972, by Gerhard Trost, the funnel-shaped bottom of the cylindrical upright tank has a rectangular cross-section with a screen surface provided therein to let the juice drip off. Further, there are arranged within the said funnel-shaped bottom, above the screw, agitators designated as "paddels for better mash distribution", which have their axes extending in parallel to the screw axis and which obviously serve the additional function to avoid any formation of a bridge of pomace after the juice has been drained off. These agitators provided in the rectangular funnel are very expensive, and they also presuppose a rectangular cross-section of the funnel-shaped bottom. However, this rectangular cross-section of the funnel leads to a very considerable increase of the production cost because the tank which has the form of a circular cylindrical shell must be provided in the region of the lower end of the cylindrical portion with a transition zone in which the circular cross-section of the tank widens to the rectangular cross-section of the funnel-shaped bottom. Accordingly, this transition zone requires the use of special sheet steel cuts of complicated shapes and consists of a relatively large number of welded-together sheet-metal cuts the complicated shapes of which are expensive to produce.

Further, a bin for loose products which are sensitive to exposure to air has been known from German Disclosed Patent Application No. 24 28 655, in which an upper portion in the form of a circular cylindrical shell ends in a slightly conical bottom followed by a ring mount which serves to make the entire bottom portion of the bin rotatable relative to the upper portion and to allow a surface sweeper to be rotated about the surface of the slightly conical bottom. The inner face of the tank in the area of the ring mount is formed by a bellows portion which obstructs the downward motion of the loose material so that this design is not suited for vessels having no surface sweepers.

Finally, a device for regulating the discharge of a material has been known from German Disclosure Document No. 15 56 722. This device is intended for metering out cocoa powder in machines for preparing hot chocolate beverages. In this device, a square tank containing the cocoa powder is followed by a bottom portion whose longitudinal walls slope inwardly from the top to the bottom to form between them a trough in which the discharge screw for the cocoa powder is arranged. The path which the cocoa powder has to overcome from the top edge to the discharge screw provided at the lower edge of the trough has the same length at any point which favors rather than prevents the formation of lumps in the cocoa powder.

In a further improvement of the invention the tank, therefore, comprises a cylindrical main and middle part ending at its top in a curved cover and at its bottom in a coneshaped bottom part.

This arrangement offers the advantage that the shape is largely adapted to a spherical tank volume, while keeping the design simple, and that at the same time sufficient space is available at the top for the fermentation of the mash and at the bottom for the arrangement of a discharge and/or draining or dripping device.

This is particularly true when according to an improvement of the invention there is fitted to the bottom of the cone-shaped bottom part a circular cylindrical portion delimited in its bottom area by plane sloping wall faces enclosing between them a discharge screw.

This arrangement offers the advantage that in the lower area practically the whole tank volume is worked by the agitator elements which reach upwardly into the space of the circular cylindrical portion, and that the room left for the discharge screw is just sufficient to permit the pomace cake to move down by pieces when the tank is almost fully drained.

Tests have shown that as a result of this shape of the funnel-shaped bottom the tank is emptied completely and the formation of bridges of pomace over the screw is largely prevented, without expensive additional agitators being required directly above the screw. This may be due to the fact that the path to the discharge screw of the pomace located in the region of the tank wall is not only of varying length, but runs also along wall portions of varying steepness, so that on its way down the pomace encounters very different conditions and therefore moves at different speeds, with the result that there are no favorable conditions for the pomace caking together above the screw.

Since the funnel-shaped bottom has the same circular shape at its upper end as the middle part of the tank which has the form of a circular cylindrical shell, no expensive constructions occur at this point, as they do in the known tank. Moreover, the lower part can also be produced very simply by cutting out a part in the form of a circular cylindrical shell and inserting an appropriately cut-out plane sheet-metal part.

The point where the sloping walls start to cut the cylindrical bottom portion may be provided at different heights. In certain embodiments of the invention, this point may be just below the upper edge of the circular cylindrical bottom portion so that there remains only a relatively short connecting piece which exhibits the circular cylindrical shape over its entire periphery.

In certain embodiments of the invention, the sloping walls extend at an angle of at most 55° to the vertical longitudinal center plane of the tank. Preferable, however, this angle is not greater than 45°, so that the pomace encounters a sufficient gradient on these wall surfaces.

In certain embodiments of the invention, the two sloping walls have the same inclination relative to the longitudinal center plane of the tank, so that the discharge screw comes to lie in the longitudinal center plane of the tank. In other embodiments of the invention, especially those in which the tank has an agitator shaft in its axis of symmetry, the discharge screw does not extend in the longitudinal center plane of the tank, but is offset laterally relative to this longitudinal center plane, so that the lower end of the shaft is located beside the screw. This can be achieved by an arrangement in which the sloping walls have the same inclination to the longitudinal center plane, but the point of intersection between the portion in the form of a circular cylindrical shell and the one sloping surface is located at a level higher than the point of intersection with the opposite sloping surface. In other embodiments of the invention, this can be achieved by giving the two sloping walls different inclinations relative to the longitudinal center plane. Finally, the sloping walls can both have different inclinations and intersect the circular cylindrical bottom portion at different heights.

These embodiments of the invention offer the advantage that the lower end of the central agitator shaft does not have to be supported directly above a discharge screw likewise located in the longitudinal center plane. This supporting structure would disturb the dropping of the pomace into the region of the screw. In the embodiments with a screw offset relative to the longitudinal center plane, however, the lower end of the agitator shaft can be mounted beside the screw in the tank wall, and this point of the tank wall can advantageously be additionally supported or stiffened on the outside.

In one embodiment of the invention, however, the lower end of the agitator shaft extends through the sloping surface and is sealed off, the lower end of the agitator shaft which projects from the tank bottom being suitably sealed and supported by supports connected to the stand of the tank.

Alternatively, it may be provided in accordance with a further improvement of the invention that the sloping wall faces end, one of them directly and the other one via a bend, in a pipe provided in oblique arrangement relative to the center plane.

This measure is particularly advantageous in smaller and simple tanks which do not include a special discharge mechanism in the form of a screw and in which the content of the tank drops out through the inclined piece of pipe.

In other embodiments of the invention, the bottom of the cone-shaped bottom part ends either in an inclined or in a centrally fitted pipe.

Both embodiments offer the advantage to render the configuration of the tank particularly simple and, thus, its production particularly easy. Arrangements with a centrally fitted downwardly extending pipe have in addition shown to be particularly useful in cases where the content of the tank is not drained into other containers under the influence of gravity, but pumped off through a hose which is flange connected to the bottom of the centrally fitted pipe.

In another example of the invention, the tank comprises a circular cylindrical portion delimited at its bottom by a sloping plane bottom face.

This measure is particularly suited for small tanks which due to their limited filling volume do not give rise to greater statical problems. The manufacture of these tanks is also particularly simple because in this case it is only necessary to provide a cylindrical body with a plane bottom face which must be sufficiently inclined to permit automatic discharging at the lowermost point of the tank.

In a variant of this embodiment, the circular cylindrical portion is delimited at its bottom by an inclined curved bottom face.

This offers the advantage of being more favorable from the statical point of view than the plane bottom face, and in addition the curved bottom face adapts itself better to an agitator sweeping through a spherical volume so that the volumes not worked by the agitator are reduced.

This is particularly true when the bottom face takes the form of a cylindrical shell whose cylinder axis intersects the center of the agitator.

In this case the inclined, curved bottom face encloses the agitated spherical volume in the manner of a tangential enveloping surface so that this tank shape gets particularly close to a spherical shape.

The two before-described embodiments of the invention comprising a sloping plane or curved bottom face offer in addition the common advantage that the residual volume not worked by the agitator, which is of course encountered in the foremost and lowermost area, is in some cases absolutely desirable, because the pips which are heavier than the juice are thus induced to gather here. The pips contain undesirable flavors so that one normally tries, for quality reasons, not to stir them constantly.

Further, the two before-described variants may be provided with a juice chamber arranged below the bottom wall and connected with the interior of the tank via a drain valve.

This arrangement offers the advantage that the space available in the press-shed can be optimally utilized because such a tank must anyway be placed on a base or on feet so that the space below the tank which would otherwise be lost can be utilized in this manner as an additional juice chamber.

According to a particularly preferred embodiment of the invention, the agitator elements are designed as circular or semi-circular rotary disks.

This embodiment offers the advantage of a particularly simple mechanical construction and, at the same time, almost complete working of the spherical volume.

When a circular rotating disk is used, it is a particular advantage that the shaft passes through the center of gravity so that the drive of the rotating disk operates continuously and is not subjected to varying stresses. On the other hand, a semi-circular rotating disk offers the advantage that—as will be described in detail below—more complex arrangements comprising several superimposed rotating disks with intersecting paths of movement can be realized without any danger of collision between the rotating disks. In the case of smaller tanks it may even be advantageous to use one semi-circular rotating disk only to achieve gentle mixing of the mash.

Another particularly preferred embodiment of the invention comprises rotating disks in the form of a flat hollow body made of sheet metal.

The advantages of this arrangement are to be seen in low production costs and a reduced weight of the rotating disk. On the other hand, the rotating disk may be given the most different shapes, simply by using correspondingly cut sheet metal blanks.

In another particularly preferred embodiment of the invention the rotating disks are provided with screen inserts which are preferably removable.

This offers the advantage that the juice in the mash is permitted to flow through the solid components in an optimized manner because the solid components, in particular the shells, are retained in the screen inserts, while the juice is permitted to pass through the screen inserts and past the shells so that the color, which as everyone knows is to be found exclusively in the shells of the red grapes, can be extracted in a particularly effective manner.

In a preferred embodiment of such a rotating disk, almost the whole surface of the rotating disk is taken up by a screen insert.

This offers the advantage that the solid mash components retained by the rotating disk are in constant contact with the juice over the whole spherical volume so that particularly efficient color extraction is achieved.

According to the invention, the embodiment described last may be used also for being mounted in fixed horizontal position in the lower portion of the tank to serve as a dripping device.

This offers the advantage that the rotating disk serves a dual purpose, namely on the one hand for stirring the mash and, on the other hand, for filtering off the solid components when the juice is to be drained at the bottom of the tank upon termination of the fermentation and stirring process. Under certain circumstances, no additional dripping device will be needed in this case because it will suffice to bring the rotating disk, which is designed as a screen, for a few minutes into a vertical position during which time the solid mash components will anyway gather on the surface of the mash due to their lower weight. When the rotating disk is thereafter fixed in the horizontal position, practically all solid components are above the screen so that they can be separated from the liquid components in a particularly easy way, simply by draining the juice.

In a further embodiment of the invention, the agitator elements are provided with obstacles in the form of projections extending in parallel to the shaft.

This offers the advantage that when the agitator element moves through its lowermost position, the solid mash particles retained on the bottom face of the agitator element cannot move up suddenly, but are retained by the obstacles so that the color extraction continues even during lifting of the solid components.

In a further embodiment of the invention, the agitator elements are provided with heat exchanger elements.

The advantage of this measure is to be seen in the fact that the temperature at which fermentation starts can be reached more quickly by guiding a heating agent through the heat exchanger elements while on the other hand excessive heating up during fermentation and a possible reduction in quality of the mash that may result therefrom can be prevented by introducing a cooling agent.

The heat exchanger elements of this arrangement are preferably connected to a supply line and a return line introduced into the agitator through the shaft.

This offers the advantage that the heat exchanging agent can be supplied to and from the agitator in an easy manner using a usual rotating joint.

Especially when the rotating disk takes the form of a hollow body, the heat exchanger elements may preferably take the form of channels in the hollow body.

The advantage of such an arrangement is to be seen in the fact that on the one hand the channels can be of a relatively simple construction while on the other hand an excellent distribution of the heat over the surface of the rotating disk can be achieved.

The heat exchanging channels may preferably take the form of walls provided in labyrinth arrangement within the hollow body.

This offers the advantage that the full surface of the rotating disk is utilized for the heat exchanging process because the heat exchanging agent gets into contact with all surface portions during its way through the labyrinth.

In a further preferred embodiment of the invention, the agitator elements are provided with a raised edge which preferably extends around their whole periphery.

This also offers the advantage that the solid mash components are kept in contact with the rotating disk as long as possible, and this because the solid components are caught within a volume defined on the one hand by the shaft and on the other hand by the raised edge.

Another embodiment of the invention is characterized by several agitators being provided in the tank in superimposed arrangement.

The advantage of this arrangement is to be seen in the fact that even great tank volumes can be realized on a relatively small ground surface using the favorable concept of an upright cylindrical tank. This permits tanks of great capacity to be provided also in operations where space is relatively limited.

According to the invention, the neighboring agitators of such arrangements may turn either in the same or in opposite senses.

The advantage of this arrangement is to be seen in the fact that different mixing ways can be adjusted to obtain the best possible wine quality with different vine species. If neighboring agitators rotate in the same sense, the distance between the shafts of circular rotating disks may be advantageously selected to be larger than $\sqrt{2}$ times the radius of the rotating disk.

This offers the advantage that the superimposed agitators can be arranged very closely to each other without the rotating disks of two neighboring agitators hitting against each other.

In another preferred embodiment of the invention using several agitators, the uppermost agitator is directly rotated by a drive, while the lower agitators are driven by an auxiliary power take-off shaft of the drive, via clutches, or through separate shiftable drives.

The advantage of this arrangement is to be seen in the fact that if desired the uppermost agitator can be driven only, while the lower agitators can remain stationary. Driving the uppermost agitator may be sufficient when the tank is filled to the top, because the solid mash components will anyway gather in the uppermost tank area due to their lower weight. The lower agitators would in this case stir pure juice only, which could lead to turbidities being set free whereby the wine quality would notably deteriorate. The lower agitators could be driven for instance only during the first phase of the treatment in the tank when the freshly filled-in mash still contains solid components in all tank areas. When the agitators, as described above, are provided with heat exchanger elements, the lower agitators will be used later, after they have been stopped, for heating up or cooling the mash. The possibility to drive the superimposed agitators selectively offers in addition the advantage that when the tank is not filled to the top, the agitator located in the area of the mash surface can be driven, while any agitators arranged on top of it may be fully stopped. This also helps minimize the required driving power.

If several superimposed agitators are to be driven via a common drive, this may be achieved in accordance with the invention either via a crank drive or a chain drive which may be provided, if necessary, with conventional coupling elements. Both drive types offer the particular advantage for this application that they are practically insensitive to humidity as the gear elements are in form-locking, rather than frictional engagement with each other.

In another preferred embodiment of the invention, the agitators are adjustable in height.

This arrangement also offers the advantage that the position of the agitator can be adjusted to the filling level of the tank when the tank is not filled to the top, so that the agitator can be adjusted on the one hand to achieve particularly effective mixing of the mash in the upper portion while stirring of the pure juice in the lower areas can be practically avoided.

A wine mash tank known from German Disclosure Document No. 32 25 009 comprises at its bottom a cone-shaped i.e. frusto-conical portion which encloses a screen arrangement in the form of the outer surface of a truncated cone, the dimensions of which are a little smaller than those of the frusto-conical tank portion. The screen arrangement is subdivided into sectors that can be individually fitted into the frusto-conical tank portion. The wall portion is provided in this area with drain pipes for the juice. When these pipes are opened, the juice present in the area between the screens and the tank wall can flow off, and the solid mash components which settle on the outside of the screen sectors are separated out, while the juice is permitted to flow through the screens and into the drain pipe.

In one embodiment of the known tank, the screen sectors are provided on their lower ends with an extension reaching into a circular cylindrical tank portion forming the prolongation of the cone-shaped bottom portion.

It need not be explained that the screen sectors of the known tank have a relatively complicated form because the outer surface of a truncated cone, followed by the outer surface of a cylinder, must be composed of individual sector-shaped segments which must be provided at their upper and lower ends with sealing and holding means to prevent the mash with its solid components from penetrating at these points between the screen and the tank wall.

The relatively complicated shape of the screens of the known tank, however, does not only render their production complicated and expensive, but makes cleaning of the screens also difficult and makes it necessary as a rule either to remove the screen segments individually through a manhole provided in the tank or to have the screens cleaned in the tank by a person entering the tank.

In addition, it is a drawback of the known tank that the drain pipe for the juice must be separately provided and will have to be arranged at a finite distance from the lowermost point of the tank. This requires on the one hand the use of additional fittings, and on the other hand complete draining of the tank is rendered impossible because the pipe is not located at the lowermost point of the tank.

A further embodiment of the present invention therefore provides that a dripping device is arranged in the area of the circular cylindrical portion which subdivides the tank by at least one screen into a mash chamber and a juice chamber, that the screen is of plane and circular shape, extends in the dripping position over the whole cross-section of the circular cylindrical portion and can be transferred from the dripping position into a position in which the mash can pass freely through the circular cylindrical portion and to the discharge screw.

Accordingly, this embodiment of the invention offers the considerable advantage that a very effective dripping device is obtained by a minimum of constructional input, and that when this dripping device is used practically the whole content of the mash tank is to be found above the screen so that almost complete dripping-off can be achieved. In addition, the arrangement of the invention offers the advantage that no additional fittings are required for draining the juice because the juice may be drained through the opening anyway existing in the area of the discharge screw. As the screen can be moved out of the dripping position, it does not hinder the pomace when it has to be discharged from the tank by the screw after dripping-off.

In a preferred embodiment of the invention, the circular cylindrical portion comprises a strainer box in which screen inserts are arranged for displacement in a plane extending vertically to the center plane of the tank, and into a position outwardly of the cross-section of the circular cylindrical portion.

This offers the advantage that the screen can be fully withdrawn from the tank from the outside, with only a few manipulations, so that the pomace, i.e. the solid mash components, can freely move downwards and towards the discharge screw after termination of the dripping-off process. This transition from the "dripping-off" step to the "pomace-discharging" step must be timed very precisely because after dripping-off the remaining pomace components tend to cake together very quickly due to their high sugar content and because such a solid pomace cake can be removed from the tank only with mechanical force. It is, therefore, a particular advantage of the invention that the screen inserts can be removed with a few manipulations so that the pomace can drop into the area of the discharge screw while it is still moist and not firmly caked together.

In a further embodiment of the invention, the screen inserts are arranged in strainer drawers, for linear displacement along guide strips.

The advantage of this arrangement is to be seen in the fact that the drawers can be fully removed from the strainer box so that the screens can be easily cleaned outside the tank, for instance using a water hose.

In a further embodiment of the invention using a strainer box in the circular cylindrical portion, the screen inserts are mounted to pivot about an axis extending in parallel to the center plane of the tank.

This also offers the advantage that the screen inserts can be laterally removed from the circular cylindrical portion with only a few manipulations and can then be cleaned outside the tank.

In another embodiment of the invention, a shaft serving as pivot axis for semi-circular screen inserts passes through the circular cylindrical portion in a direction vertical to the center plane of the tank.

In this embodiment of the invention, the screen inserts remain normally within the tank. The path for the pomace components towards the discharge screw is made free by the screen inserts being pivoted about the shaft. This embodiment also offers the advantage that to make the way free for the pomace the screen inserts need only be unlocked and then moved out of the way by simply turning the shaft or permitting the inserts to drop under the effect of their own weight.

When in an embodiment according to the variant described last the screen inserts are provided in rigid arrangement relative to each other for being pivoted jointly with the shaft, the screen insert may on the one hand be rotated by 90° to a position in which the pomace components can drop past the screen. On the other hand, the screen insert may be used in this embodiment of the invention for stirring the mash in the lower portion of the tank before dripping-off, as necessary for instance in the case of red wine mash for the reasons outlined before.

In a further improvement of this variant, the screen inserts are, however, pivoted on the shaft individually, preferably in the manner of a hinge, and can be folded up or down from a position forming a plane extending vertically to the center plane of the tank, the screen inserts being preferably held in the position forming the plane by lateral pins which can be displaced in the axial direction.

Thus, this embodiment of the invention offers the advantage that by simply pulling out the pins, the screen inserts can be caused for example to drop downwardly under the effect of their own weight or of the weight of the pomace so that the pomace is permitted to drop past the screen inserts towards the discharge screw. After all pomace has been discharged and the inner faces of the tank have been rinsed from the top using a water hose, the screen inserts may be folded up by 180° to permit any residual pomace components that may have been trapped between the folded screen inserts, to be washed off.

Further advantages of the invention will be apparent from the following specification and the attached drawing.

It goes without saying the individual features of the present invention may be realized with advantage also separately or in any other combination than that described hereafter.

BRIEF DESCRIPTION OF THE DRAWING

The invention will be described hereafter with reference to the drawing in which:

FIG. 7 shows a diagrammatic representation of another embodiment of the invention comprising three superimposed, but different agitators;

FIG. 8 shows a diagrammatic representation of a crank drive driving commonly several superimposed agitators of the type shown in FIGS. 6 or 7;

FIG. 9 is a representation similar to that shown in FIG. 8, but for a chain drive;

FIG. 10 shows a diagrammatic representation of an embodiment of the invention similar to that shown in FIGS. 5a and b, but with the agitators provided with heat exchanger elements;

FIG. 11 shows a diagrammatic side view, partly broken away, of the bottom portion of a tank in accordance with the invention, with a drain pipe attached in oblique arrangement;

FIGS. 13 to 15 show three embodiments of circular rotating disks with different screen inserts;

FIG. 16 shows an embodiment of the invention similar to that shown in FIGS. 5a and b, in which a lower rotating disk fitted with drain inserts is fixed in the horizontal position;

FIG. 17 shows an embodiment of the invention similar to that shown in FIGS. 5a and b, but with a vertically adjustable agitator;

FIG. 21b is a cross-sectional view along line XVIII—XVIII in FIG. 21a;

DESCRIPTION OF THE PREFERRED EMBODIMENTS

Figure 1:
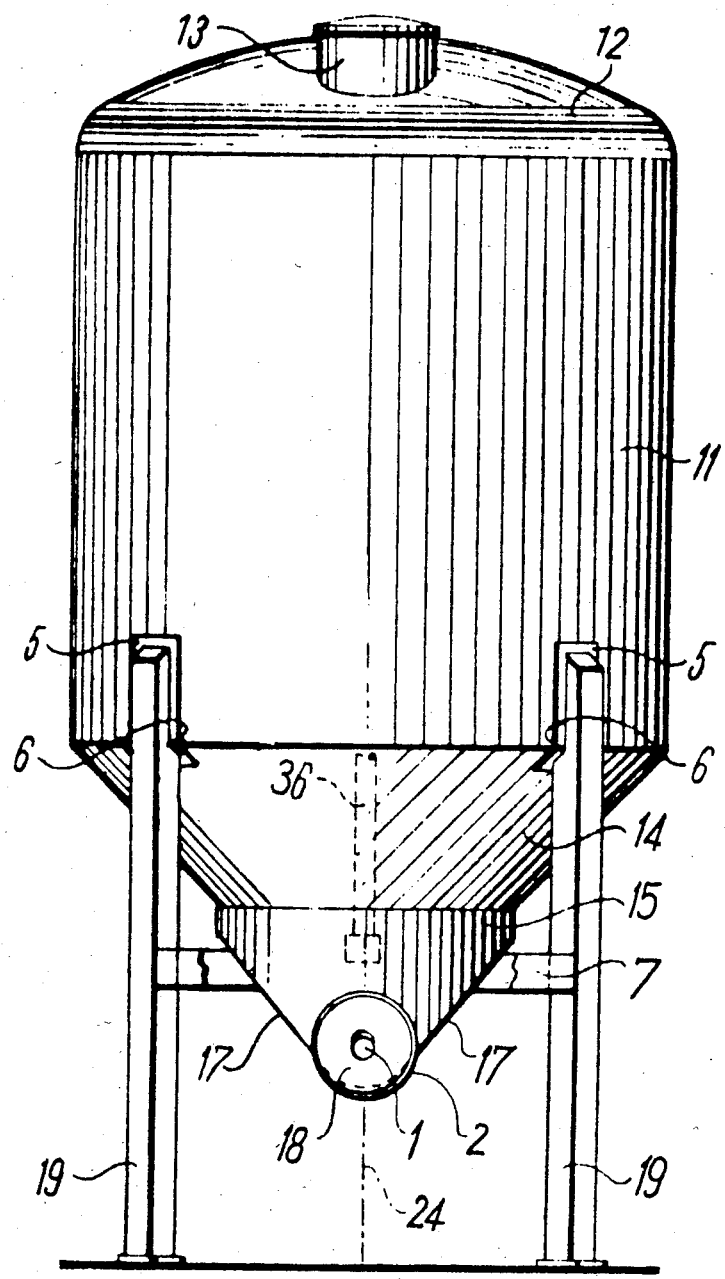
FIG. 1 shows a front view of an embodiment of a tank according to the invention.
Figure 2:
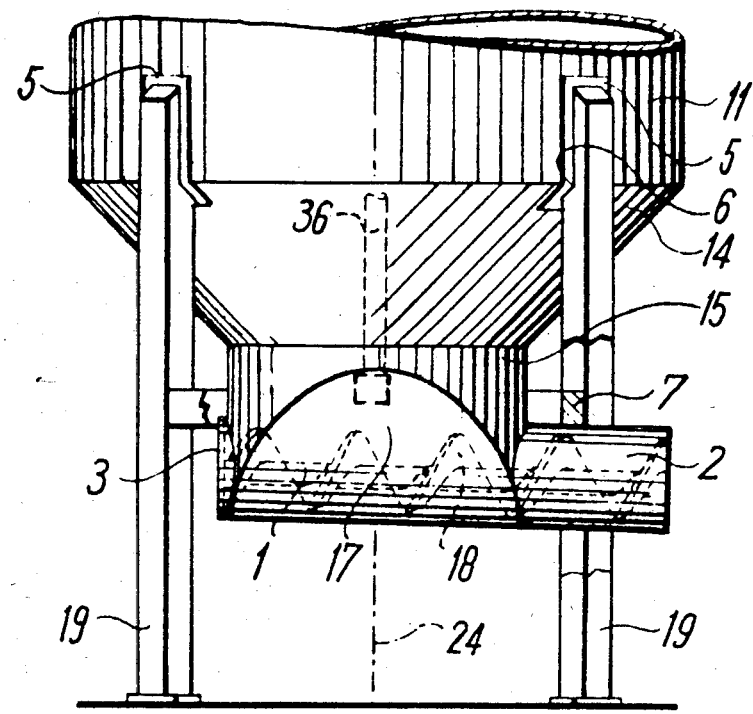
FIG. 2 shows a corresponding side view.

In a embodiment of the invention illustrated in FIGS. 1 and 2, the main and middle part 11 is designed in the form of a circular cylindrical shell. It is closed at the top by a cover 12 which has a filling orifice 13. Four legs 19 support the lower portion of the part 11 and carry bearing plates 5 at their upper ends. Each of the said legs has a shoulder 6 at the lower end of the circular cylindrical shell, the lower edge of the part 11 being supported on these shoulders. The legs 19 are inter-connected by struts 7.

Adjoining the lower end of the circular-cylindrical middle part 11 is a truncated cone-shaped bottom part 14, to the lower end of which is fastened a circular cylindrical portion 15 which is intersected by two oppositely arranged sloping plane walls 17. The lower ends of the sloping wall faces 17 are connected to one another by a surface forming a circular cylinder segment. Located in the region of this segment-shaped bottom portion 1 and between the lower ends of the sloping walls 17 is a discharge screw 18, the drive of which is not shown and the longitudinal axis of which is inclined somewhat obliquely to the horizontal.

In the area of the screw 18, the circular cylindrical portion 15 has fastened to it at the front of the tank a connecting piece 2, and at the rear of the tank a relatively short cap 3 with a plane end face in which the rear end of the screw shaft is seated. The front closure of the connecting piece 2 and other parts not absolutely essential for understanding the invention are not shown in the drawing.

The tank shown in FIGS. 1 and 2 as well as the tanks of the other embodiments, described hereinafter, and the various components as agitators, sieves, outlets and the like may be made from steel, stainless steel or plastic material, preferably fiberglass reinforced plastic material.

In the embodiment illustrated in FIGS. 1 and 2, the two sloping walls 17 have the same inclination relative to the longitudinal center plane 24, and the circular cylindrical portion 15 is cut by these plane walls 17 at the same height.

Figure 3:
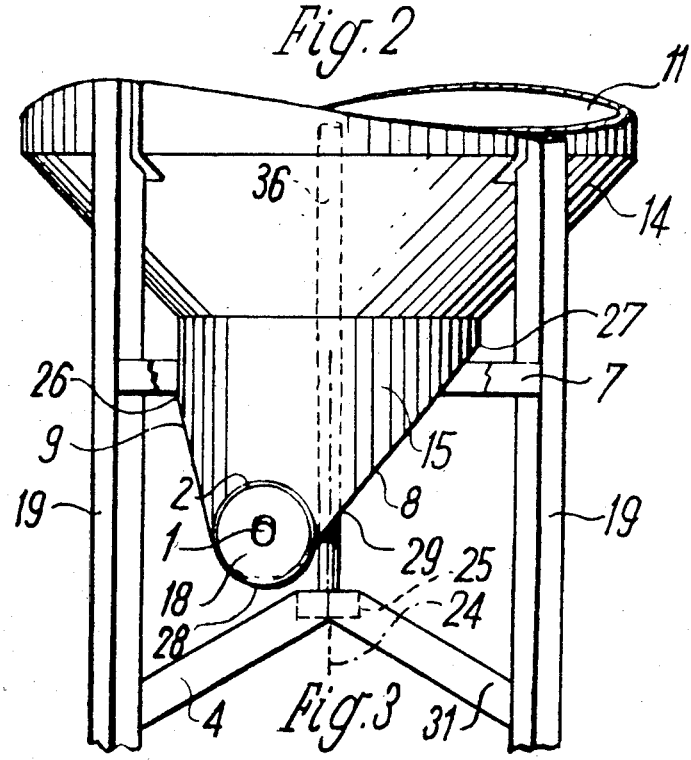
FIG. 3 shows a view corresponding to FIG. 1 of an embodiment which has the discharge screw located beside the longitudinal center plane.

The embodiment of the invention illustrated in FIG. 3 differs from the embodiment shown in FIGS. 1 and 2 in that the discharge screw 18, including the connecting piece 2 and the cap 3, is located to the side of the longitudinal center plane 24. The sloping wall surfaces 8 and 9 extend at different angles to the longitudinal center plane 24. The plane wall surface 8 extends at an angle of approximately 45° relative to the longitudinal center plane 24, and it cuts the circular-cylindrical bottom portion 15 at a relatively great height. The plane sloping wall 9 extends at a substantially smaller angle relative to the longitudinal center plane 24, which may amount to 15° in the embodiment shown, and its topmost edge 26 of intersection with the circular cylindrical bottom portion 15 is much further down than the topmost edge 27 of intersection of the portion 15 with the sloping plane wall surface 8.

In this embodiment of the invention, the lower ends of the sloping walls 8 and 9 are again connected to one another by a sheet-metal portion 28 bent in the from of a circular cylinder segment, and the discharge screw 18 is located in this portion 28 and between the lower ends of the walls 8 and 9. Since the screw 18 is located alongside, i.e., adjacent to the longitudinal center plane 24, agitator shaft 36 located centrally in the tank and consequently in the longitudinal center plane 24 can be lengthened downwardly, as compared to the embodiment according to FIGS. 1 and 2, so that it extends past the screw 18 and passes outwardly through a sealed-off orifice 29 in the sloping wall 8 and is supported on the outside in a bearing 25 which is, in turn, supported from below by struts 4 extending obliquely downwards from the bearing 25 and fastened to the legs 19.

Figure 4:
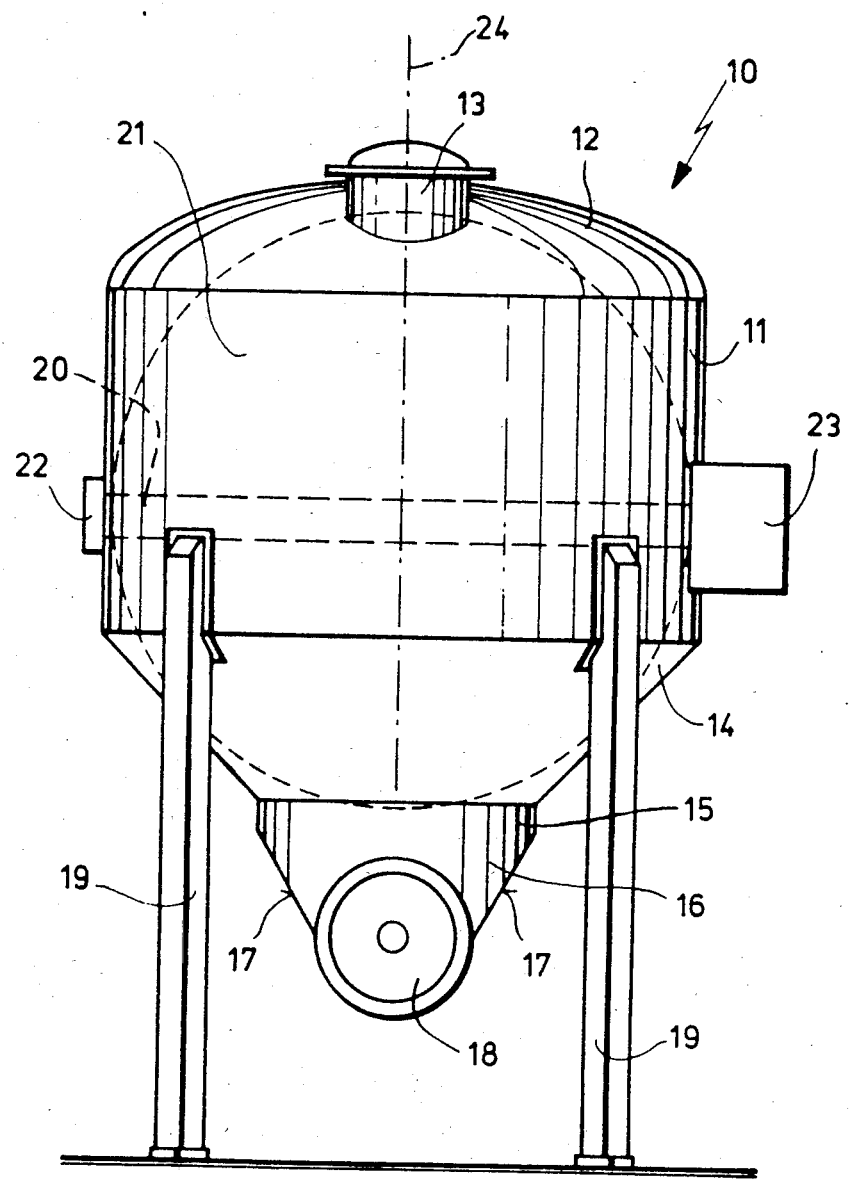
FIG. 4 shows a front view of details of another embodiment of a fermentation tank in accordance with the invention.

In FIG. 4, an upright tank 10 can be seen whose center portion is formed by a main and middle part 11 with a curved cover 12 provided with a filling orifice 13 attached on top of it. The lower portion of the main and middle part 11 ends in a downwardly tapering cone-shaped portion 14 which is in turn followed by a circular cylindrical portion 15. The circular cylindrical portion 15 is laterally defined, at a certain distance from the cone-shaped bottom part 14, by two sloping plane walls 17 meeting at the bottom in a curved portion in which a discharge screw 18 is arranged with its shaft extending in parallel to the sloping walls 17. The tank 10 rests on four feet 19 supporting the tank 10 in the area of the transition between the main and middle part 11 and the cone-shaped bottom part 14. The height of the feet 19 is such that the discharge screw 18, which may simultaneously serve for draining the liquid content from the tank, is sufficiently spaced from the bottom.

The before-described tank 10 serves for treating red wine mash which, as is generally known, must be stirred during fermentation in order to wash out the red color from the solid mash components, in particular the grape shells.

According to the invention, a horizontal shaft 20 shown in phantom in FIG. 4, is arranged preferably in the area of the main and middle part 11, which is supported by a bearing 22 and driven in the area of the opposite wall of the main and middle part 11 by a drive 23 indicated in FIG. 4 only in a diagrammatic way. The shaft 20 which, thus, extends perpendicularly to the center plane 24 of the tank 10, carries a circular rotating disk 21. FIG. 4 shows already very clearly that the shape of the tank 10 comprising a main and middle part 11, the cover 12, the cone-shaped bottom part 14 and the circular cylindrical portion 15 is largely adapted to a spherical shape so that practically the full volume of the tank is worked by the rotating disk 21.

It goes without saying that the most different agitator elements may be used in connection with the present invention, if only the volume worked by them during rotation of the horizontal shaft 20 is practically that of a complete sphere. Of course, this will be reached in the first line by circular or—as will be described in detail below—semi-circular rotating disks, but the use of split, star- shaped, several paddle-like or other agitator elements is also imaginable within the framework of the present invention.

Figure 5A:
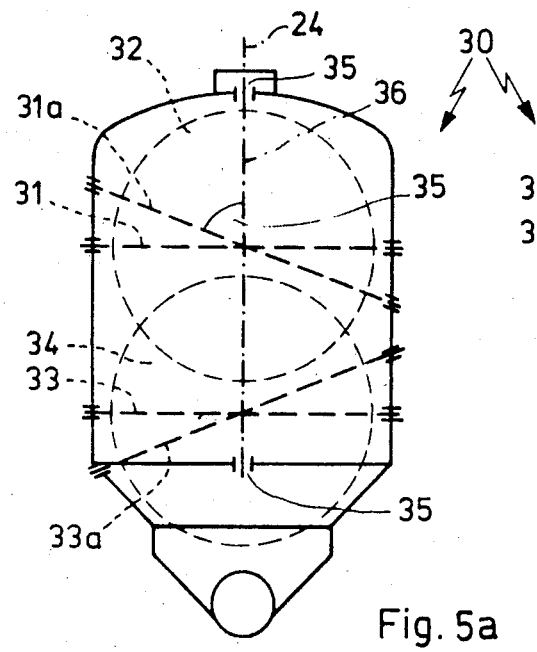
FIGS. 5a and 5b are diagrammatic cross-sectional drawings of another embodiment of the invention comprising two superimposed agitators.
Figure 5B:
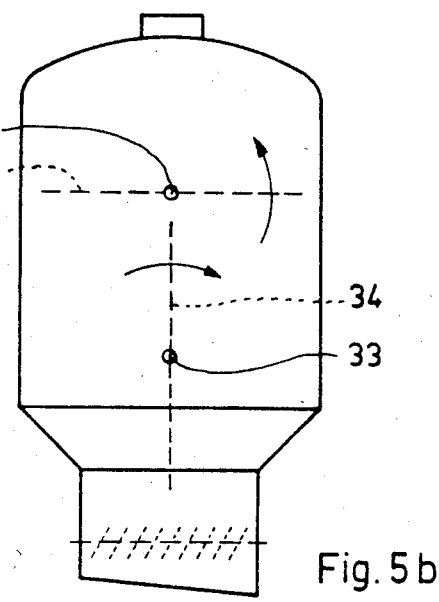

In the embodiment illustrated in FIGS. 5a and 5b which show diagrammatic views of the tanks turned by 90°, the red wine fermentation tank is indicated by 30. An upper rotating disk 32 is mounted to rotate about an upper shaft 31, while a lower rotating disk 34 is mounted for rotation about a lower shaft 33. As indicated by the arrows in FIG. 5 b, the rotating disks 32, 34 are arranged to rotate in opposite senses, for instance the rotating disk 32 in counterclockwise direction and the rotating disk 34 in clockwise direction. This arrangement in which the rotating disks 32, 34 are in "intermeshing engagement" like gears, permits the shafts 31, 33 to be arranged closely together because the rotating disks 32, 34 cannot obstruct each other.

FIG. 5a shows another variant of the invention in which the shafts 31a, 33a of the superimposed rotating disks are inclined relative to the center plane 24 at an angle 35 not equal to 90°. The shafts 31a, 33a may be inclined in opposite directions, as shown in-FIG. 5a, or else in the same direction and by the same angle 35 so that they extend in parallel to each other.

Bearings indicated at 35 in FIG. 5a show that in another variant the shaft 36 may extend vertically and carry one or more rotating elements.

Figure 6A:
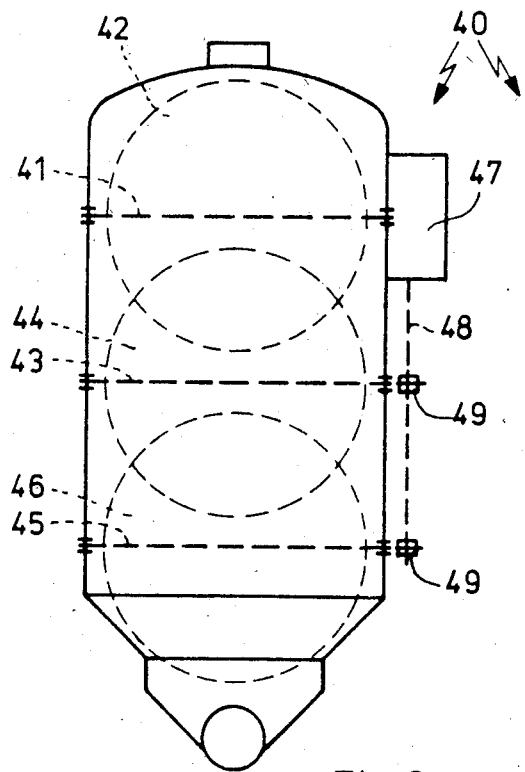
FIGS. 6a and 6b show a diagrammatic representation of another embodiment of the invention comprising three superimposed agitators.
Figure 6B:
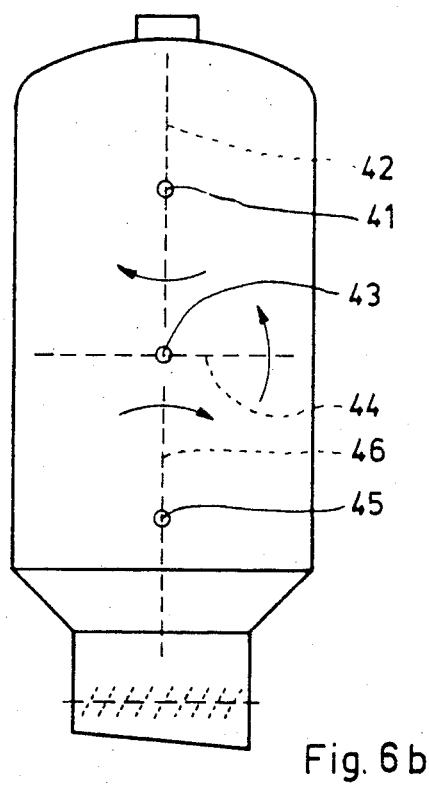

In the embodiment shown in FIGS. 6a and 6b, reference numeral 40 indicates the red wine fermentation tank. An upper rotating disk 42 is mounted to rotate about an upper shaft 41, a middle rotating disk 44 is arranged to rotate about a middle shaft 43, and a lower rotating disk 46 is mounted to rotate about a lower shaft 45. The upper shaft 41 is directly driven by a drive 47 provided at its level. The middle shaft 43 and the lower shaft 45 can also be driven by the drive 47, via an auxiliary drive indicated by 48, and shiftable clutches 49.

As can be seen in FIG. 6b, the disks of each pair of neighboring rotating disks 42, 44 and 44, 46 rotate in opposite senses. This permits the spacing of the shafts 41, 43, 45 to be kept small and, thus, the total volume of the tank 40 to be optimally worked.

Now, when mash is filled into the tank 40 one may for instance initially operate all rotating disks 42, 44, 46 by engaging the clutches 49. When after a certain period of time the solid mash components have collected in the upper portion of the tank 40 due to their lower weight, the clutches 49 may then be disengaged so that only the uppermost rotating disk 42 continues to be driven by the drive 47. In this stage, only juice without any solid components will be contained in the areas of the middle and lower rotating disks 44, 46, and continuous stirring of the juice would only lead to unnecessary turbidities being set free.

It goes without saying that instead of using the auxiliary drive 48 and the shiftable clutches 49, each shaft 41, 43, 45 could also be provided with a separate shiftable drive. Further, an isolator clutch can be provided for the shaft 41 within the drive system 47 so that the common drive 47 can be used to drive the shafts 43 or 45 selectively. This possibility to selectively drive any of the three shafts 41, 43, 45, makes it possible to account for different filling levels of the tank 40. If, for instance, mash is filled in only to a level just above the shaft 43, then the upper rotating disk 42 may remain stationary, while only the middle rotating disk 44 and the lower rotating disk 46, or else the middle rotating disk 44 alone, are driven to mix the mash.

The embodiment shown in FIG. 7 comprises an arrangement similar to that shown in FIGS. 6a and 6b. An upper, a middle and a lower shaft 51, 53, 55 carry again an upper, a middle and a lower rotating disk 52, 54, 56, respectively, except that here the shape of the middle rotating disk 54 is that of a semi-circular disk. This measure may help reduce the center spacing between the shafts 51, 53, 55, in particular when the rotating disks rotate in the same direction.

This condition, namely that the shafts 51, 53, 55 rotate in the same direction, is illustrated in the embodiment shown in FIG. 8, in which the three shafts 51, 53, 55 are commonly driven via a crank drive. The crank drive comprises cranks 60, 61, 62 rigidly connected with the shafts 51, 53, 55. The other ends of the cranks 60, 61, 62 are hinged on a common connecting rod 63. Now, when for example the lowermost shaft 55 is driven via a sprocket wheel 64 and a chain 66, by a sprocket wheel 65 of a drive not shown in FIG. 8, the shaft 55 and, thus, the lower rotating disk 56 will turn for instance in clockwise direction. The crank 62 and the connecting rod 63, and the cranks 60 and 61 transmit the same movement in a conventional manner to the upper shafts 51 and 53.

It can be easily seen that when the shafts 51, 53, 55 rotate in the same direction, the spacing d between the shafts 51, 53, 55 must be $\sqrt{2}$ times greater than the radius r of a rotating disk 52, because otherwise the lower portion of an upper rotating disk would during movement collide with the upper portion of a lower rotating disk.

In the embodiment shown in FIG. 9, the shafts of each neighboring pair of shafts 51, 53 and 53, 55, respectively, are caused to rotate in opposite senses. To this end, the shafts 51, 53, 55 are provided with sprocket wheels 70, 71, 72 engaging a one-part or two-part chain 73a, 73b which is crossed between each pair of shafts 51, 53 and 53, 55, respectively.

It is, however, understood that the present invention is by no means restricted to the common drive mechanisms shown in FIGS. 8 and 9, but that other known common drives of a mechanical, electric or hydraulic type may also be employed.

The embodiment shown in FIG. 10 corresponds to that illustrated in FIGS. 5a and 5b. It shows a perspective view of a tank 80 with an upper and a lower rotating disk 82, 84 mounted for rotation about an upper and a lower shaft 81, 83, respectively.

The tank 80 shown in FIG. 10 is insofar improved over the before-described embodiments as each of the rotating disks 82, 84 comprises heat exchanger means served by a supply line 85 and a return line 86. The heat exchanger elements 87 pass through the rotating disks 82, 84 preferably in the way of a meander. The supply line 85 and return line 86 pass through the shafts 81 and 83, respectively, for example in the form of coaxial pipes, so that usual rotating joints for liquids can be employed.

After the mash has been filled into the fermentation tank 80, a heating agent is preferably passed through the heat exchanger elements 87 so that the newly filled-in mash will quickly reach the temperature at which fermentation starts. After fermentation has set in, a cooling agent may be passed through the heat exchanger elements 87 to avoid overheating of the mash.

The embodiment shown in FIG. 11 uses a tank bottom configuration different from that shown for the embodiments described before. The design of the fermentation tank 90 of FIG. 11 is substantially identical to that shown for instance for the embodiment of FIG. 4, except for the area of the sloping plane wall faces 17a, 17b where the fermentation tank 90 ends in an oblique pipe 91 which is joined by the plane sloping face 17a directly and by the plane sloping face 17b via a bend, the pipe being arranged at an angle 93 relative to the center plane 24 of the tank 90.

The embodiment shown in FIG. 11 is particularly suited for simple and small tanks which do not require active discharge means in the form of a discharge screw as indicated at 18 in FIG. 4. The relatively small amount of material contained in the tank 90 will discharge automatically via the inclined pipe 91 along the axis 92 and out of the tank.

Figure 12:
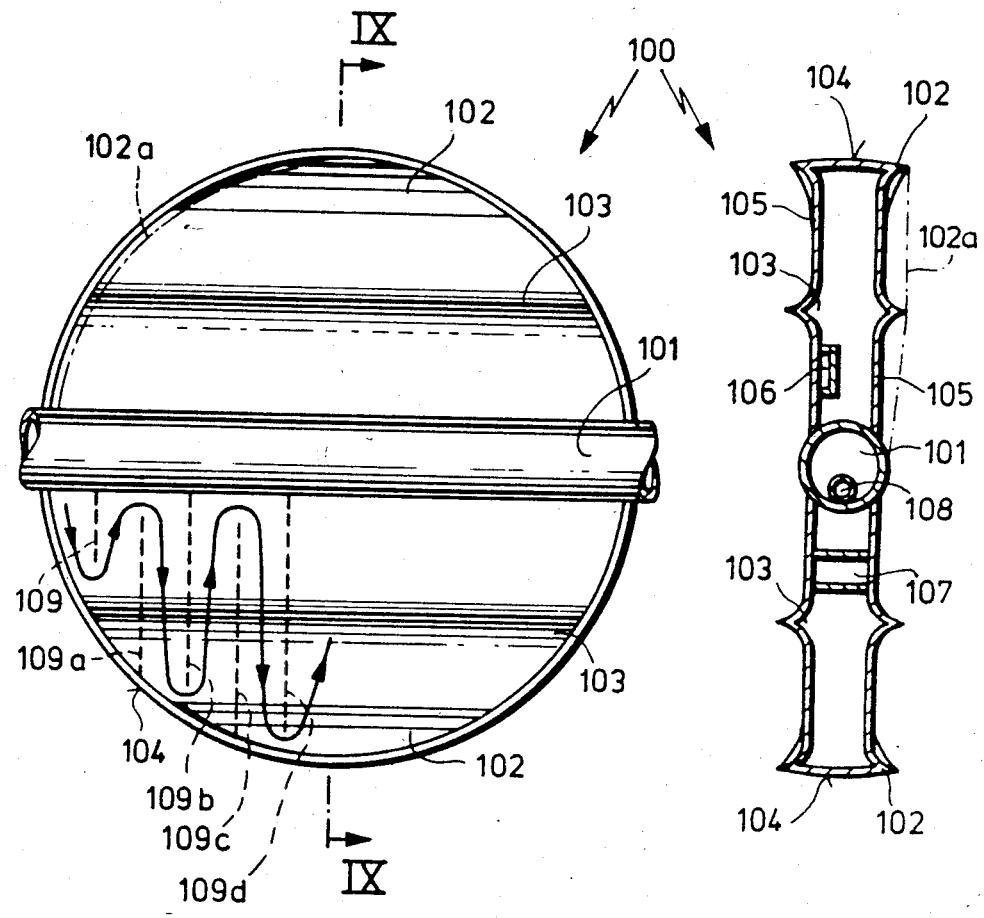
FIGS. 12a and 12b show an enlarged view of one embodiment of the invention using a circular rotating disk in the form of a hollow body.

The rotating disk 100 represented in FIGS. 12a and 12b in a larger scale is formed integrally with a hollow shaft 101. A raised edge portion 102 is provided along part of its periphery, for instance only in parallel to the hollow shaft 101. However, this raised edge portion may also extend over the full periphery, as indicated at 102a. Further, an obstacle 103 is provided in parallel to the hollow shaft 101, at a distance of about half the radius of the rotating disk 100. This obstacle 103 takes the form of a pointed projection rising above the otherwise flat surface of the rotating disk 100, as can be seen best in the cross-sectional representation of FIG. 12b. The obstacles 103 serve to render it more difficult for the solid and lighter components of the mash to slip upwards past the rotating disk 100 when the latter occupies for example the vertical position shown in FIG. 12b. Generally, the solid mash components are retained within the volume formed by the raised edge portions 102, 102a together with the obstacles 103, above the surface of the rotating disk 100.

End face 104 of the rotating disk 100 is preferably curved so that a perfect fit is realized between the disk and the inside of the respective tank.

Further it can be seen in the cross-sectional representation of FIG. 12b that the rotating disk 100 of this embodiment is designed as a hollow body made of sheet metal 105. Moreover, the arrangement of FIGS. 12a and 12b is suited for operation in both senses of rotation so that both faces of the rotating disk 100 are provided with corresponding raised edge portions 102, 102a and obstacles 103.

As can be further seen, heat exchanger channels 106, 107 can be realized in such a hollow body in a simple manner either by welding a U-shaped section to the inside of the sheet metal wall 105 of the body, as indicated at 106, or by forming a heat exchanger channel within the inner space with the aid of two webs, as indicated at 107. However, it is of course also possible to solder, bond or clamp suitable pipes, for instance copper pipes, to the inside of the sheet metal wall 105. FIG. 12a shows another variant of a heat exchanger arrangement in which the rotating disk 100 is provided with walls 109, 109a, 109b, 109c and 109d arranged in the form of a labyrinth radially to the hollow shaft 101. These walls are attached alternately to the hollow shaft 101 (109, 109b, 109d) and to the periphery of the rotating disk 100 (109a, 109c). Thus, the path indicated by the line with arrows in FIG. 12a is obtained for the heat exchanging agent. It appears that in moving along this path through the labyrinth formed by the walls 109 to 109d, the heat exchanging agent gets into contact with the whole surface of the rotating disk 100 so that the whole surface participates in the heat exchanging process.

Finally, a line 108 is to be seen in FIG. 12b which serves as a supply and return line for the heat exchanging agent, as explained in connection with the lines 85 and 86 of FIG. 10.

FIGS. 13 to 15 show three additional embodiments of rotating disks provided with screen inserts.

The rotating disk 110 shown in FIG. 13 comprises a plurality of circular screen inserts 112 so that grape juice can flow practically freely through the screen inserts 112 in the surface 110 of the disk. Preferably, the screen inserts 112 are arranged substantially in parallel to the shaft 111 so that an obstacle 113 may be provided in parallel to the shaft 111 in the space between two rows of screen inserts 112, as described in connection with the obstacle 103 in FIGS. 12a and 12b. Further, a raised edge 114 may be provided.

The screen inserts 112 are preferably removable and can also be left away, either all or some of them, as indicated at 112a.

In the embodiment shown in FIG. 14, a rotating disk 120 is mounted on a shaft 121. There are provided, by way of example, eight sector-shaped screen inserts 122 extending radially outwardly from the center of the rotating disk 120. Thus, a mechanically stable arrangement, and yet a large screen surface, is obtained.

The embodiment shown in FIG. 15 comprises a rotating disk 123 mounted on a shaft 124 and provided with a screen insert 125 which extends practically over the full surface of the rotating disk 123. The screen insert 125 may also be subdivided into two strips 125a, 125b extending in parallel to the shaft 124 and enclosing between them an obstacle 126.

The screen inserts 112, 122, 125 of the embodiments shown in FIGS. 13 to 15 ensure that the solid mash components, in particular the shells, are stirred through the juice so that they are constantly kept in particularly intimate contact with the juice.

The rotating disks 110, 120, 123, in particular the embodiment 123 comprising the large screen insert 125, may simultaneously serve as dripping device, as illustrated in FIG. 16.

It appears that a tank 30 as described in detail in connection with FIGS. 5a and 5b comprises a lower rotating disk 123 of the type shown in FIG. 15. This rotating disk 123 serves in the first line for stirring the red wine mash in the manner described before. Now, when the fermentation process is completed, the rotating disk 123 is moved for a short time into a vertical position so that all solid mash components are permitted to rise to the surface of the mash. The rotating disk 123 is then moved into the horizontal position shown in FIG. 16 and fixed in this position my means of bolts 127. Now, a discharge opening for the juice may be opened in the area of the discharge screw 18. Since practically all solid mash components are to be found above the horizontally fixed rotating disk 123 which now serves as a dripping device, the grape juice is filtered off, while the solid components gather in FIG. 16 above the rotating disk 123 to form a so-called pomace cake. Before the latter cakes together to form a solid mass which is difficult to separate, the rotating disk 123 is returned to its vertical position, after removing the bolts 127, so that the pomace can drop into the area of the discharge screw 18 for being discharged from the tank 30 in the conventional manner. But the rotating disk 123 may also be turned by 180° and then fixed again in position so that the pomace pieces will drop down and any residues can be washed off through the opening 13 in the cover 12 using a water jet.

Finally, FIG. 17 shows another variant of the tank 30 in which for example the shaft 31 of the upper rotating disk 32 can be adjusted in height as indicated by the double arrow, so that the shaft 31 and the rotating disk 32 can be moved for example into the position indicated in FIG. 17 by 31' and 32'. This makes it possible to adapt the stirring mechanism constituted by the rotating disk 32 to different filling levels of the tank 30 so that the rotating disk 32 will always rotate in the area of the mash surface.

In order to prevent any sealing problems in connection with the tank 30, it is suggested by the embodiment shown in FIG. 17 to arrange the common drive of several shafts 31, if more than one shaft is provided, also on the inside of the tank in which case it may be advantageous to provide crank drives of the type shown in FIG. 8 which have a particularly small number of moving parts and which may be either adjustable by steps or infinitely variable.

It goes without saying that the tanks, the shafts, the rotating disks and the other parts described, such as screen inserts, drives, and the like, are preferably made of stainless steel, but it is of course also possible to use a normal, suitably protected steel, and for non-load bearing elements, such as the rotating disks and the screen inserts, plastic materials are also imaginable. The rotating disk 100 of FIGS. 12a and 12b may, for example, be injection-molded or blow-molded from a plastic material.

Figure 18:
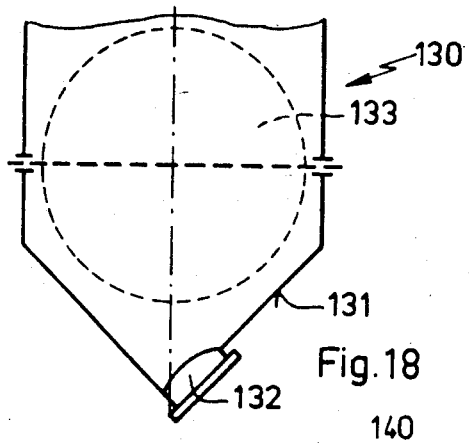
FIG. 18 is a diagrammatic side view, partly broken away, of the bottom portion of another embodiment of a tank in accordance with the invention, with a drain pipe attached in oblique arrangement.

FIG. 18 shows another variant of a tank 130 resembling that shown in FIG. 11. The lower portion of the tank 130 is likewise formed by a cone-shaped bottom portion 131 which ends however directly in an oblique pipe 132. The transition between the cone-shaped bottom portion and the oblique pipe is formed on the one side by a direct transition between the sloping wall of the cone-shaped bottom portion 131 and the oblique pipe 132, while the opposite sloping wall forms a corresponding bend. The shape of the tank is in this case also well adapted to a spherical volume because the rotating disk 133 projects with its lower portion into the cone-shaped bottom portion 131 so that it works practically the whole lower volume of the tank 130.

Figure 19:
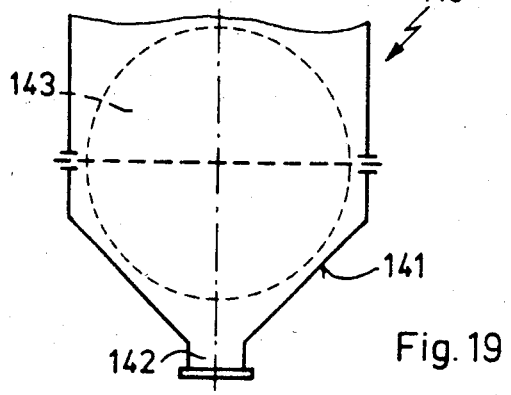
FIG. 19 is a diagrammatic side view, partly broken away, of the bottom portion of another embodiment of a tank in accordance with the invention, with a centrally mounted drain pipe.

FIG. 19 shows a further variant which likewise resembles those shown in FIG. 11 and FIG. 18.

The tank 140 in FIG. 19 comprises likewise a cone-shaped bottom portion 141 but ends in this case in a central pipe 142 extending vertically downwardly from the lowermost point of the cone-shaped bottom portion 141. Again, a rotating disk 143 projects with its lower portion into the cone-shaped bottom portion 141.

The embodiment shown in FIG. 19 is particularly suited for smaller pipes 142 of the type normally used for draining a mash tank by pumping using a hose connected to its bottom outlet.

Figure 20:
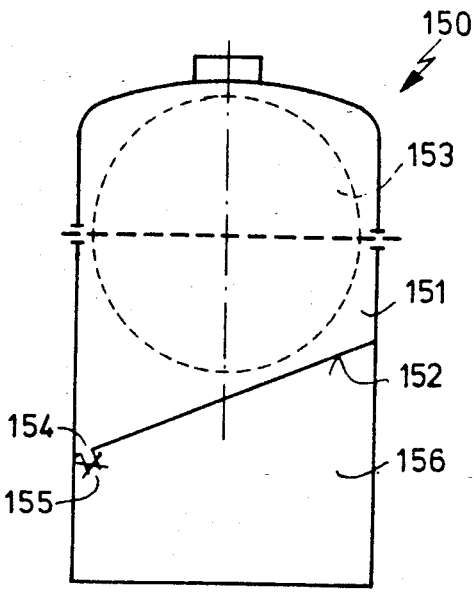
FIG. 20 is a side view of another embodiment of a tank in accordance with the invention, with a sloping plane bottom wall.

In the embodiment shown in FIG. 20, a tank 150 comprises a main and middle part 151 delimited at its bottom by a sloping plane bottom wall 152. A rotating disk 153 is arranged substantially in the area of the main and middle part 151, but projects with its lower portion close to the bottom wall 152 which extends at a small distance from the rotating disk 153 and tangentially thereto. The sloping plane bottom wall 152 defines a lowermost point 154 in the tank 150 which may be provided with a drain valve 155 which in the case of the embodiment shown in FIG. 20 leads to a juice chamber 156 arranged below the tank 150. The juice chamber 156 may be realized as an integrally formed extension of the main and middle part 151, but it is of course also possible to place the sloping plane bottom wall 152 of the tank 115 on a base or on feet and to provide in the area of such base or feet a separate juice chamber 156 which can be pulled out, in FIG. 20 for example from the right side.

Figure 21A:
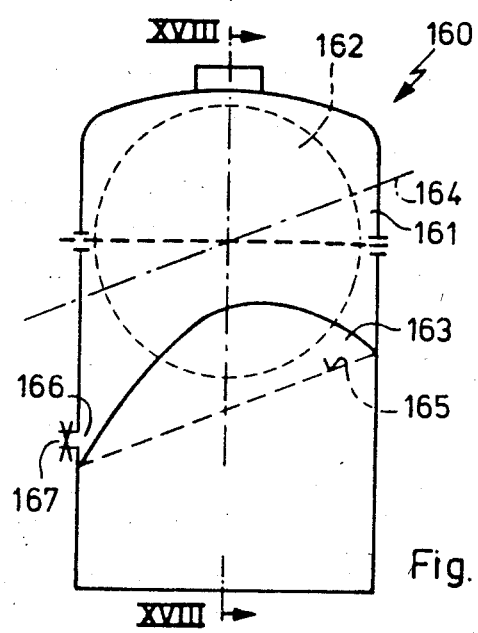
FIG. 21a shows a representation similar to that shown in FIG. 20, but for another embodiment of the invention comprising a sloping curved bottom wall.
Figure 21B:
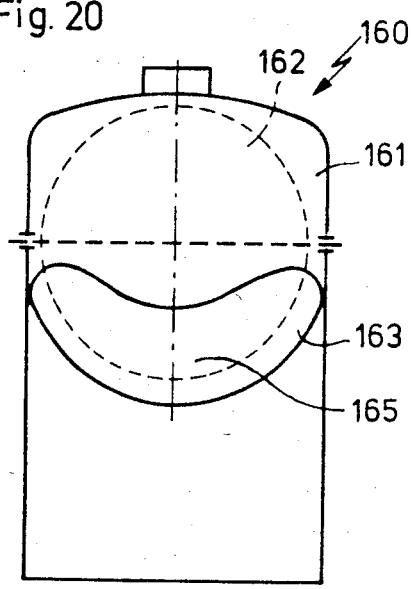

FIGS. 21*a* and 21*b* show a side view and a sectional view of another embodiment of the invention in which a tank 160 comprises a main and middle part 161 which in turn encloses a rotating disk 162. The underside of the main and middle part 161 is defined by a sloping, but curved bottom wall 163. The sloping curved bottom wall 163 has preferably the shape of a cylinder surface with the imaginary cylinder axis—indicated at 164 in FIG. 21*a*—passing through the center of the rotating disk 162. Consequently, the bottom wall 163 forms a tangential enveloping surface of the spherical volume worked by the rotating disk 162. In addition, a straight sloping line 165 is formed at the bottom of the bottom wall 163 the lower end of which defines the lowermost point 166 of the tank 160. In the embodiment shown in FIG. 21, a drain valve 167 is provided at the lowermost point 166 which valve, contrary to the embodiment shown in FIG. 20, opens to the outside. But it goes without saying that the arrangement of the valves 155 and 167 of FIGS. 20 and 21 may also be vice versa.

Figure 22:
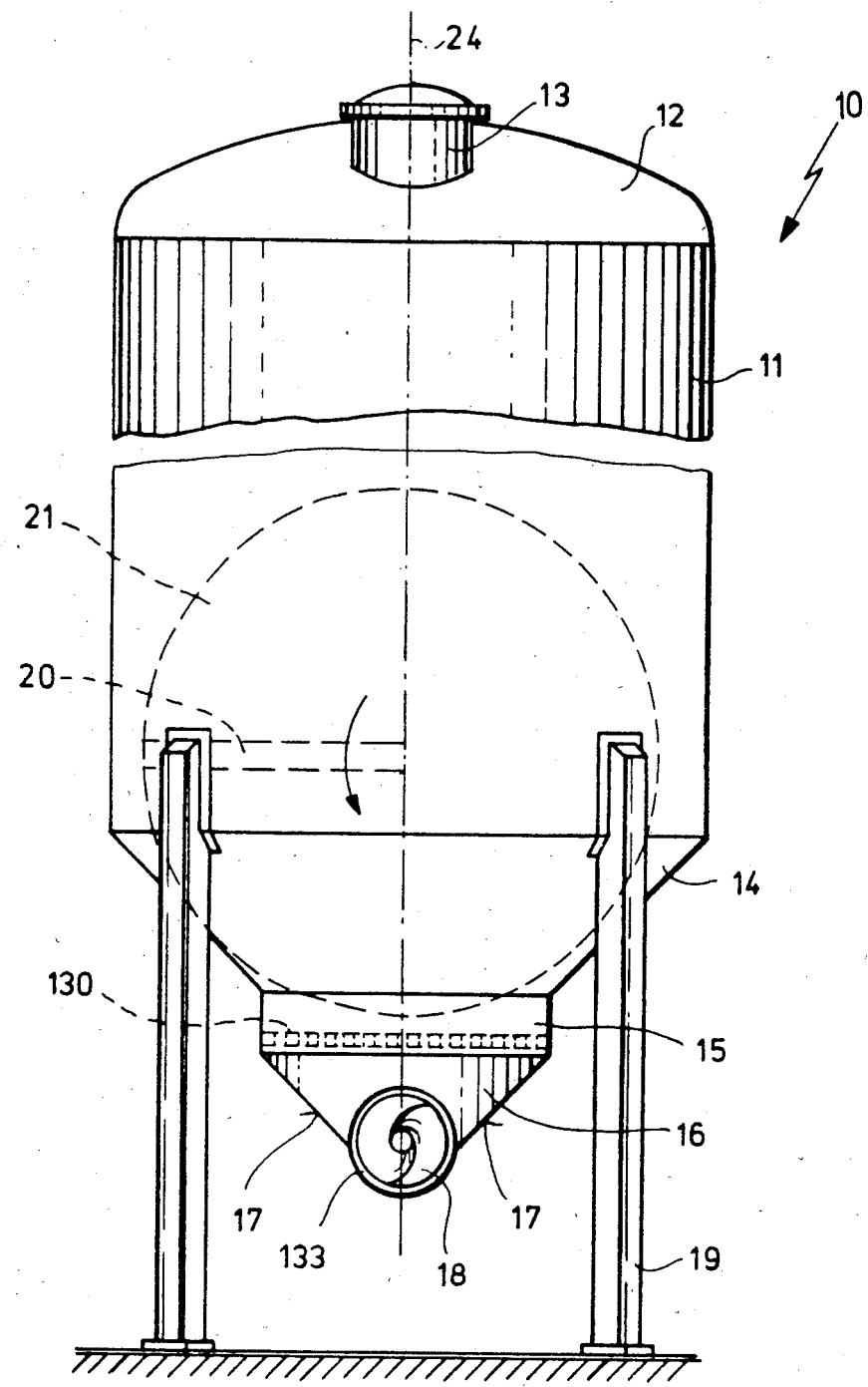
FIG. 22 is a front view of one embodiment of a tank in accordance with the invention.

In FIG. 22, another upright tank of the type shown in FIGS. 1 and 4 and as normally used for storing and treating wine mash is generally designated by reference numeral 10. Identical elements have been designated by the same reference numerals.

It should however be noted that the tank 10 of the present invention is by no means suited only for storing and treating red wine mash, but may also be used with advantage for storing and treating white wine mash, although the latter is usually not stirred.

Figure 23:
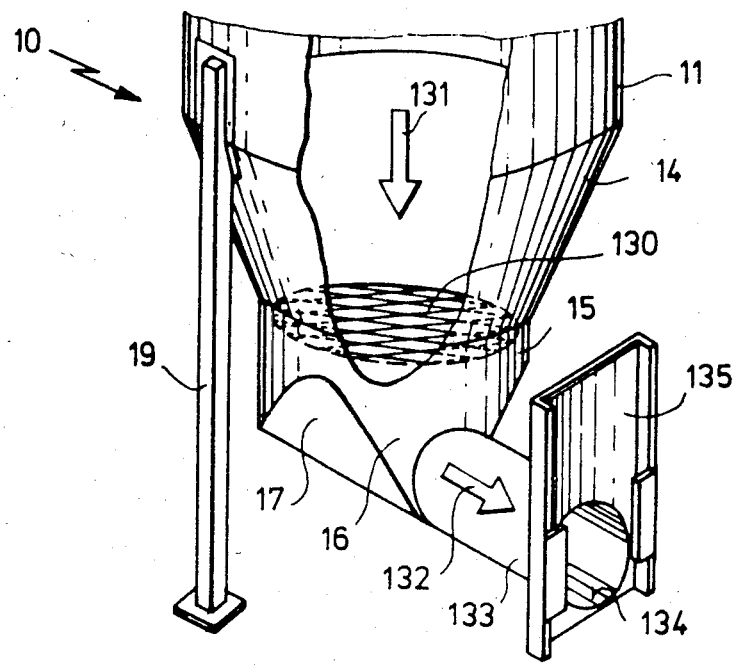
FIG. 23 is a perspective view, viewed at an angle from the top and partly broken away, of the bottom portion of the tank shown in FIG. 22.

As can be seen in FIG. 22, but even better in FIG. 23, a screen 130 is arranged within the main and middle part 15 in a plane extending vertically to the center plane 24. The screen 130 takes up almost the full interior cross-section of the main and middle part 15. Now, when the tank 10 is filled with a wine mash, i.e. a mixture of grape juice (liquid component) and pomace (solid components), it will become necessary at a given point of time to separate the liquid component from the solid components by means of a dripping device formed in the case of the present invention by the screen 130. The grape juice flows under the effect of its own weight in the direction indicated in FIG. 23 at 131 and through the screen 130, while the pomace components are retained above the screen 130. The juice then flows in the direction indicated by the arrow 132 underneath the screen 130, and through a drain pipe 133 enclosing the discharge screw 18 and leading to an outlet 134 that can be closed by a slide 135.

It is clearly apparent from FIG. 23 that apart from the screen 130 no additional means are required to realize the dripping device in the tank 10.

Figure 24:
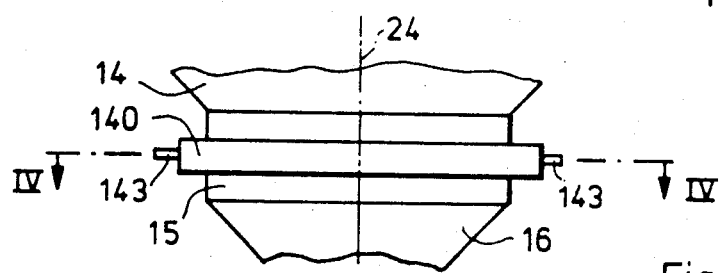
FIG. 24 is a diagrammatic side view of the tank bottom portion of another embodiment of the invention.

A further embodiment of the invention illustrated in FIG. 24 shows how the details of the screen 130 according to FIGS. 22 and 23 can be realized.

A strainer box 138 attached to all sides of the main and middle portion 15 of the tank 10 is provided with two laterally mounted guide strips 139, 140. The strainer box 138 and the guide strips 139, 140 serve as guides for two drawers 141, 142 which can be pulled out by handles 143 in the direction indicated by the arrows 144. In the embodiment shown in FIGS. 24 and 25, the drawers 141, 142 are divided by a separating line 145, which means that they are of two-part design. But it is of course also possible to use only a single drawer instead of the two drawers 141, 142 without parting from the scope of the invention.

Each of the drawers 141, 142 comprises a semi-circular screen insert 146, 147. The combined surface of these inserts is just equal to the interior cross-section of the main and middle part 15.

Figure 25:
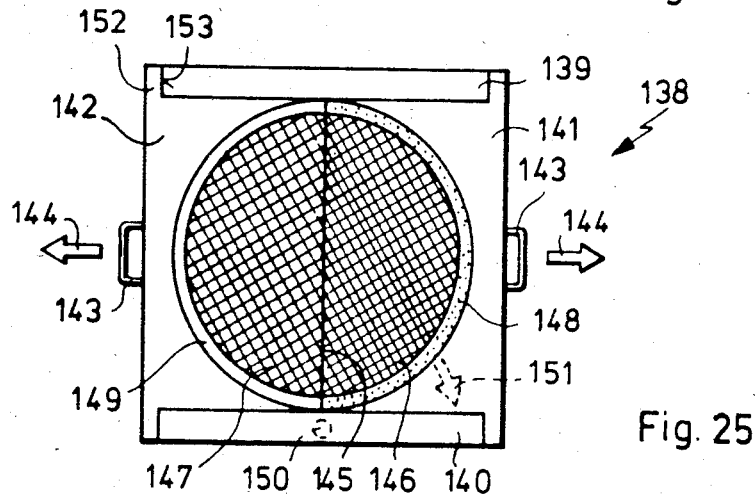
FIG. 25 is a diagrammatic view along plane IV–IV in FIG. 24.

Sealing of the drawers 141, 142 or the screen inserts 146, 147 in the filled condition of the tank 10 is effected either by means of the brush seals 148 shown in the right half of FIG. 25, or else by means of conventional rubber seals 149 indicated in the left half of FIG. 25.

Another possibility of sealing the tank consists in realizing the connection between the strainer box 138 and the main and middle part 15 on all sides as a pressuretight welding seam, or to form the strainer box integrally with the main and the middle part 15, and to provide the seal in the area of the separating plane 153 defined by lateral flanges 152 at the front of the drawers 141, 142.

When, after dripping of the mash, the screen inserts 146, 147 are to be pulled out laterally in the direction indicated by the arrows 144, the brush seals 148 fixed to the main and middle portion 15 may serve as stripping means for the screen inserts 146, 147. If no such brush seals 148 are used it is easily possible to provide additional stripping means in the form of rubber lips or the like which will then simultaneously perform the function of a temporary seal as long as there still remain pomace components above the lateral opening in the main and middle part 15 from which the drawers 141, 142 are pulled out.

In another variant of the embodiment shown in FIGS. 24 and 25, the screen inserts 146, 147 are not pulled out laterally in the way of drawers, but pivoted outwardly about an axis 150 extending in parallel to the center plane 24, as indicated in the right half of FIG. 25 by the arrow 151 shown in broken lines.

Figure 26:
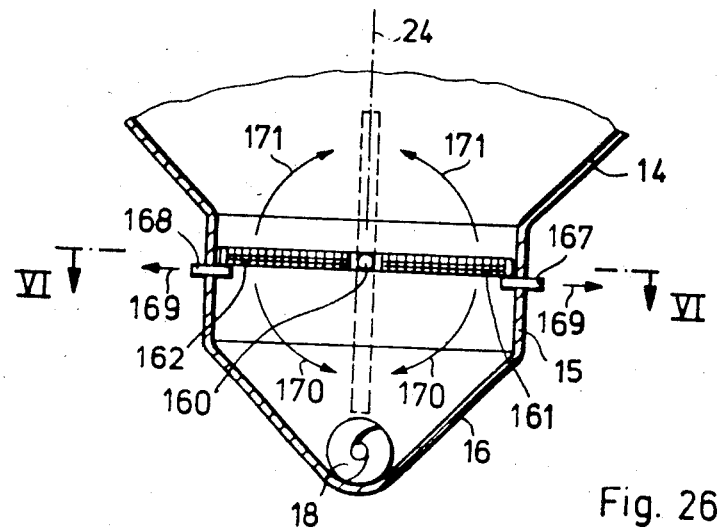
FIG. 26 is a diagrammatic side view of a tank bottom portion of another embodiment of the invention.
Figure 27:
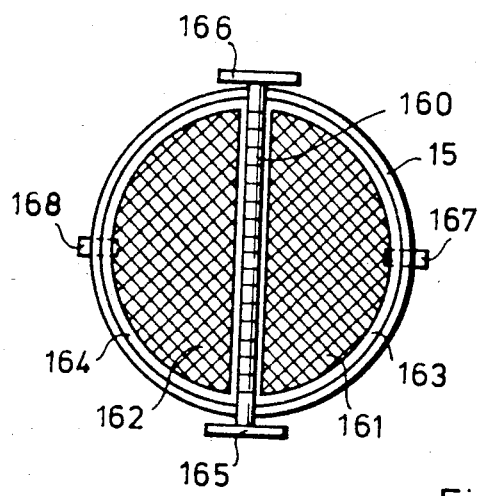
FIG. 27 is a diagrammatic view along plane VI—VI in FIG. 26.

FIGS. 26 and 27 show another embodiment of the invention in which the main and middle part 15 is passed by a shaft 160 in a direction perpendicular to the center plane 24. The shaft 160 is preferably designed in the form of a hinge and carries screen inserts 161, 162 which are pivotally mounted thereon. The screen inserts 161, 162 are fully surrounded by a frame 163 having two semi-circular halves, each half having a semi-circular screen insert mounted therein, the frame halves each being pivotally mounted on the shaft. To permit the screen inserts 161, 162 to be turned about the shaft 160, handwheels 165, 166, levers or the like are provided at the ends of the shaft. For example, the handwheel 165 may coact with the screen insert 161, and the handwheel 166 with the screen insert 162, so that the screen inserts can be turned also independently of each other.

The screen inserts 161, 162 are retained in a plane vertical to the center plane 24 by lateral pins 167, 168 which can be displaced in the direction indicated by the arrows 169. In the position shown in FIG. 26, the pins 167, 168 project inwardly into the main and middle part 15 and hold the screen inserts 161, 162 by their periphery. But when the pins 167, 168 are retracted or unscrewed in the direction indicated by the arrows 169, the screen inserts 161, 162 may either drop automatically in the direction indicated by the arrows 170 or be moved up in the direction of the arrows 171 by means of the handwheels 165, 166.

In a further embodiment of the invention, the screen inserts 161, 162 are rigidly interconnected and can be commonly turned about the shaft 160. If the shaft 160 is provided in this case with a power drive instead of the handwheels 165, 166, the arrangement comprising the screen inserts 161, 162 may serve as a rotating disk in the area of the main and middle portion 15 for treating red wine mash. This may be useful for example if very high-quality wines are to be processed which normally arrive in very small quantities so that they may perhaps fill only a small area of a large cellarage tank, maybe only the area defined by the screw casing comprising the tank portions 14 to 16.

However, when the arrangement comprising the screen inserts 161, 162 is primarily intended to be used as dripping device, one will normally, at the end of the dripping process when the juice stops dripping through the screen inserts 161, 162, retract or unscrew the pins 167, 168 in the manner described before so that the screen inserts 161, 162 will drop down under the effect of their own weight and under the weight of the pomace resting thereon. Then the pomace components may be discharged by the screw 18 through the discharge pipe 133 (see FIG. 23). The screen inserts 161, 162 can then be cleaned on all sides by rinsing them initially in the folded-down position using a water jet, moving them up thereafter by 180° in the direction indicated by the arrows 171 using the handwheels 165, 166, and rinsing them thereafter in this position from the opposite side.

I claim:

1. A red wine fermentation tank comprising:
    an upright tank having a substantially circular transverse cross-section, a longitudinal center line, a cylindrical main and middle part, a curved cover and a cone-shaped bottom part, the curved cover being positioned along the upper perimeter of the cylindrical main and middle part, and the cone-shaped bottom part being positioned along the lower perimeter of the cylindrical main and middle part; and
    at least one agitator arranged within the tank so as to sweep through at least a substantially spherical volume, each agitator including a shaft and a rotary disc mounted on the shaft whereby the rotary disc may be rotated, the rotary disk being circular or semi-circular and substantially continuous.

2. A fermentation tank in accordance with claim 1, wherein the bottom of the cone-shaped bottom part is provided with a circular cylindrical portion, which portion has a pair of planar, sloping walls which define the bottom area of the portion and wherein a discharge screw is positioned between the pair of planar, sloping walls.

3. A tank according to claim 2, wherein the pair of planar, sloping walls are arranged at an angle of at most 55° to the longitudinal center line of the tank.

4. A tank according to claim 2, wherein the pair of planar sloping walls are arranged at an angle of at most 45° to the longitudinal center line of the tank.

5. A tank according to claim 2, wherein one agitator shaft is provided and is positioned vertically and along the longitudinal center line, of the tank and wherein the discharge screw is located adjacent to the longitudinal center line.

6. A tank according to claim 5, wherein the lower end of the agitator shaft which is centrally arranged in the tank is located adjacent to the discharge screw.

7. A tank in accordance with claim 5, wherein the agitator shaft is centrally arranged in the tank and the lower end thereof extends through one of said pair of planar, sloping walls and is supported outside the tank.

8. A tank according to claim 2, wherein the pair of planar, sloping walls have different inclinations relative to the longitudinal center line of the tank.

9. A tank according to claim 8, wherein the pair of planar, sloping walls intersect the circular cylindrical portion at different heights.

10. A fermentation tank in accordance with claim 2, wherein a dripping device which comprises at least one circular screen is provided in the circular cylindrical portion, whereby the tank is subdivided into a mash chamber and a juice chamber, when the dripping device is in a dripping position in which the screen extends in one plane, across the entire transverse cross-section of the circular cylindrical portion, the dripping device being adapted to be transferred from the dripping position into a pass through position in which the screen no longer extends across the entire transverse cross-section of the circular cylindrical portion.

11. A fermentation tank in accordance with claim 10, wherein the dripping device comprises a strainer box having at least one screen insert.

12. A fermentation tank in accordance with claim 11, wherein the strainer box has a plurality of guide strips along which guide strips the screen insert or inserts may be horizontally moved, the strainer box being horizontally removable from the tank.

13. A fermentation tank in accordance with claim 11, wherein the dripping device comprises a shaft, which extends horizontally and is affixed to the circular cylindrical portion, and a frame having a plurality of screen inserts mounted therein, the frame being pivotally mounted on the shaft.

14. A fermentation tank in accordance with claim 10, wherein the dripping device comprises a shaft which extends horizontally and is affixed to the circular cylindrical portion, and a frame having two semi-circular halves, each half having a semi-circular screen insert mounted therein, the frame halves each being pivotally mounted on the shaft.

15. A fermentation tank in accordance with claim 14, wherein the frame halves are provided in rigid arrangement relative to the shaft and to each other, whereby they may be pivoted jointly with the shaft.

16. A fermentation tank in accordance with claim 14, wherein the frame halves are pivotally mounted on the shaft individually, whereby they may be individually folded up or down from the dripping position 17. A fermentation tank in accordance with claim 16, wherein the frame halves are held in the dripping position by lateral pins which can be displaced in the horizontal direction.

18. A fermentation tank in accordance with claim 1, wherein a pipe is provided in oblique arrangement relative to the longitudinal center line, and wherein the bottom of the cone-shaped bottom part is provided with a circular cylindrical portion, which portion has a pair of planar sloping walls which define the bottom area of the portion, one of the pair of planar, sloping walls directly extending into and ending in said pipe, the other of the pair ending in said pipe via a bend.

19. A fermentation tank in accordance with claim 1, wherein the bottom of the cone-shaped bottom part ends in a pipe attached in oblique arrangement.

20. A fermentation tank in accordance with claim 1, wherein the bottom of the cone-shaped bottom part ends in a centrally fitted pipe.

21. A fermentation tank in accordance with claim 1, wherein the tank comprises a circular cylindrical portion delimited at its bottom by a planar, sloping, bottom wall.

22. A fermentation tank in accordance with claim 1, wherein the tank comprises a circular cylindrical portion delimited at its bottom by an inclined, curved bottom wall.

23. A fermentation tank in accordance with claim 22, wherein the bottom wall has the form of a cylindrical shell whose cylindrical axis intersects the center of the agitator.

24. A fermentation tank in accordance with claim 1, wherein the rotary disc is a flat hollow body made of sheet metal.

25. A fermentation tank in accordance with claim 1, wherein the rotary disc is provided with a plurality of projections along at least one surface thereof, the projections extending in parallel to the shaft.

26. A fermentation tank in accordance with claim 1, wherein each rotary disc is provided with a raised edge portion along at least one surface thereof.

27. A fermentation tank in accordance with claim 26, wherein the raised edge portion extends around the whole periphery of at least one surface of the rotary disc.

28. A fermentation tank in accordance with claim 1, wherein the at least one agitator is adjustable in height.

29. A fermentation tank in accordance with claim 1, wherein the tank is made of steel or stainless steel.

30. A fermentation tank in accordance with claim 1, wherein the tank is made of fiberglass reinforced plastic material.

31. A red wine fermentation tank comprising:
an upright tank having a substantially circular transverse cross-section, a longitudinal center line, and a circular cylindrical portion delimited at its bottom by a planar, sloping bottom wall;
at least one agitator arranged within the tank so as to sweep through at least a substantially spherical volume, each agitator including a shaft and a rotary disc mounted on the shaft whereby the rotary disc may be rotated, the rotary disc being circular or semi-circular and substantially continuous; and
a juice chamber provided in the tank below the planar, sloping bottom wall and a drain valve provided in the planar, sloping bottom wall, the juice chamber being connected with the portion of the tank above the planar, sloping bottom wall via the drain valve.

32. A red wine fermentation tank comprising:
an upright tank having a substantially circular transverse cross-section and a longitudinal center line; and
at least one agitator arranged within the tank so as to sweep through at least a substantially spherical volume, each agitator including a shaft and a rotary disc mounted on the shaft whereby the rotary disc may be rotated, the disc being circular or semi-circular, substantially continuous, and being provided with one or more screen inserts.

33. A fermentation tank in accordance with claim 32, wherein the rotary disc is provided with a screen insert which extends along substantially the whole surface of the rotating disc.

34. A fermentation tank in accordance with claim 33, wherein the rotary disc is mounted in a lower portion of the tank and is adapted to be fixed in a horizontal position whereby the rotating disc serves as a dripping device.

35. A red wine fermentation tank comprising:
an upright tank having a substantially circular transverse cross-section and a longitudinal center line; and
at least one agitator arranged within the tank so as to sweep through at least a substantially spherical volume, each agitator being provided with heat exchanger means and including a shaft and a rotary disc mounted on the shaft whereby the rotary disc may be rotated, the rotary disc being circular or semi-circular and substantially continuous.

36. A fermentation tank in accordance with claim 25, wherein each heat exchanger means is connected to a supply line and a return line, which supply line and return line enter the agitator through the shaft.

37. A fermentation tank in accordance with claim 35, wherein each rotary disc is a flat hollow body and wherein each heat exchanger means comprises a channel provided within the rotary disk.

38. A fermentation tank in accordance with claim 37 wherein the heat exchanger channel is provided in the flat, hollow body of each rotary disc by walls arranged in the form of a labyrinth.

39. A red wine fermentation tank comprising:
an upright tank having a substantially circular transverse cross-section and a longitudinal center line; and
a plurality of agitators provided in the tank and arranged within the tank so as to sweep through at least a substantially spherical volume, each agitator including a shaft, which shaft extends generally horizontally, and a rotary disc mounted on the shaft whereby the rotary disc may be rotated, the rotary disc being circular or semi-circular and substantially continuous.

40. A fermentation tank in accordance with claim 39, wherein the rotary discs of adjacent agitators rotate in opposite directions.

41. A fermentation tank in accordance with claim 39, wherein the rotary discs of adjacent agitators rotate in the same direction.

42. A fermentation tank in accordance with claim 41, wherein the distance between the shafts of adjacent agitators is greater than $\sqrt{2}$ times the radius (r) of the rotary discs.

43. A fermentation tank in accordance with claim 39, wherein the shafts extend horizontally and wherein the shaft of the uppermost agitator is directly rotated by a drive and the shaft or shafts of the agitator or lower agitators are driven by one of an auxiliary power take-off shaft of the drive via shiftable clutches and separate shiftable drives.

44. A fermentation tank in accordance with claim 39, wherein the shafts of the agitators are commonly driven by a crank drive.

45. A fermentation tank in accordance with claim 39, wherein the shafts of the agitators are commonly driven by a chain drive.

* * * * *